(12) United States Patent
Ganev

(10) Patent No.: US 8,036,858 B2
(45) Date of Patent: Oct. 11, 2011

(54) STATISTICAL METHOD FOR ELECTRIC MACHINE OPTIMIZATION USED FOR ELECTRIC DRIVES

(75) Inventor: Evgeni Ganev, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 833 days.

(21) Appl. No.: 11/734,360

(22) Filed: Apr. 12, 2007

(65) Prior Publication Data

US 2008/0140226 A1 Jun. 12, 2008

Related U.S. Application Data

(60) Provisional application No. 60/869,678, filed on Dec. 12, 2006.

(51) Int. Cl.
*G06F 17/50* (2006.01)
(52) U.S. Cl. .......................... 703/1; 702/41
(58) Field of Classification Search .............. 703/1, 2; 702/41, 14, 17; 73/579
See application file for complete search history.

(56) References Cited

U.S. PATENT DOCUMENTS

| | | | |
|---|---|---|---|
| 5,253,331 A | 10/1993 | Lorenzen et al. | |
| 5,297,054 A | 3/1994 | Kienzle et al. | |
| 5,815,394 A | 9/1998 | Adeli et al. | |
| 5,842,192 A | 11/1998 | Garcia et al. | |
| 5,943,245 A | 8/1999 | Melfi et al. | |
| 6,038,554 A | 3/2000 | Vig | |
| 6,198,181 B1 * | 3/2001 | Ali et al. | 310/261.1 |
| 6,253,115 B1 * | 6/2001 | Martin et al. | 700/97 |
| 6,353,767 B1 * | 3/2002 | Wakeman et al. | 700/91 |
| 6,370,573 B1 | 4/2002 | Bowman-Amuah | |
| 6,405,344 B1 * | 6/2002 | Ali et al. | 716/2 |
| 6,535,775 B1 * | 3/2003 | Bagepalli et al. | 700/109 |
| 6,571,202 B1 | 5/2003 | Loman et al. | |
| 6,725,183 B1 * | 4/2004 | Cawse | 703/2 |
| 6,859,674 B1 | 2/2005 | Seth et al. | |
| 6,961,687 B1 | 11/2005 | Myers, Jr. et al. | |
| 7,010,472 B1 | 3/2006 | Vasey-Glandon et al. | |
| 7,031,787 B2 | 4/2006 | Kalthoff et al. | |
| 7,107,159 B2 * | 9/2006 | German | 702/41 |
| 2004/0148044 A1 | 7/2004 | Arnaud et al. | |
| 2005/0177260 A1 | 8/2005 | Schweizerhof et al. | |
| 2006/0224325 A1 | 10/2006 | Conway et al. | |

OTHER PUBLICATIONS

Williamson et al., Optimization of the Geometry of Closed Rotor Slots for Cage Induction Motors, Jun. 1996, IEEE, vol. 32, No. 3, pp. 560-568.*
Hoehn W K (ED) and Foo Say Wei (ED), "Robust Designs Through Design to Six Sigma Manufacturability", Jun. 28-30, 1995, pp. 241-246; Proceedings of the 1995 IEEE Annual International Engineering Management Conference, Singapore, New York, IEEE, US, Jun. 28, 1995.
EP Search Report—Aug. 1, 2011—Application No. 07122404.2-2221/1933263.

* cited by examiner

*Primary Examiner* — Paul Rodriguez
*Assistant Examiner* — Bernard E Cothran
(74) *Attorney, Agent, or Firm* — Miriam Jackson, Esq.

(57) ABSTRACT

A method is provided for selecting and optimizing an electric drive system by analyzing critical-to-quality subjects of the electric drive system according to Six Sigma theory. The critical-to-quality subjects include weight, volume, reliability, efficiency and cost. Various design approaches may be evaluated to select an optimal design. The design approaches may include electric machine type, cooling system, electrical integration and electrical-mechanical interface.

11 Claims, 5 Drawing Sheets

NOTE 1: 10=BEST, 1=WORST
NOTE 2: ROTOR THERMAL LIMITATION FOR PMM IS 200° C

| KEY CHARACTERISTICS | MACHINE TYPE | DC BRUSH PM | IM | SRM | PMM TOOTH 2 POLES | PMM TOOTH MULTI | PMM TOOTHLESS 2 POLES | PMM TOOTHLESS MULTI |
|---|---|---|---|---|---|---|---|---|
| KC 1 | ROTOR LOSSES | 1 | 6 | 6 | 10 | 10 | 10 | 10 |
| KC 2 | STATOR LOSSES | 10 | 4 | 4 | 5 | 6 | 4 | 5 |
| KC 3 | WINDAGE LOSSES | 3 | 5 | 1 | 9 | 9 | 10 | 10 |
| KC 4 | ROTOR THERMAL LIMITATIONS | 6 | 8 | 10 | 4 | 4 | 4 | 4 |
| KC 5 | COOLING OPTIONS | 1 | 5 | 5 | 9 | 9 | 10 | 10 |
| KC 6 | ROTOR MECHANICAL LIMITATIONS | 1 | 5 | 7 | 9 | 9 | 10 | 10 |
| KC 7 | TORQUE-TO-INERTIA RATIO | 6 | 5 | 5 | 9 | 9 | 10 | 10 |
| KC 8 | TORQUE PULSATION | 2 | 9 | 3 | 6 | 6 | 10 | 10 |
| KC 9 | COMPATIBILITY WITH BEARINGS | 2 | 5 | 5 | 9 | 9 | 10 | 10 |
| KC 10 | HIGH-SPEED CAPABILITY | 1 | 5 | 7 | 9 | 9 | 10 | 10 |
| KC 11 | SHORT CIRCUIT BEHAVIOR | 1 | 10 | 10 | 4 | 4 | 3 | 3 |
| KC 12 | MACHINE COMPLEXITY | 5 | 7 | 10 | 9 | 9 | 8 | 8 |
| KC 13 | CURRENT DENSITY | 1 | 7 | 7 | 10 | 10 | 8 | 8 |
| KC 14 | POWER SENSITY | 1 | 7 | 8 | 10 | 10 | 8 | 8 |
| | TOTAL | 41 | 88 | 88 | 112 | 113 | 115 | 116 |

FIG. 3

STATISTICAL METHOD FOR ELECTRIC MACHINE OPTIMIZATION USED FOR ELECTRIC DRIVES

CROSS REFERENCE TO RELATED APPLICATIONS

The present application claims the benefit of U.S. Provisional Patent Application No. 60/869,678, filed on Dec. 12, 2006.

BACKGROUND OF THE INVENTION

The present invention generally relates to apparatus and methods for optimizing electric machines and, more specifically, to apparatus and methods of using Six Sigma theory for selecting and optimizing high performance electric drives.

Electric machines (EMs) for high performance electric drives (HPEDs) play a significant role in the modern aerospace and military industries. This is particularly true in the area of more electric architecture (MEA) for aircraft, spacecraft, and military ground vehicles. The commercial aircraft business is moving toward no-bleed air environmental control systems (ECS), variable-frequency (VF) and direct current (DC) power distribution buses, and electrical actuation. Some military aircraft already utilize MEA for both primary and secondary flight control. Military ground vehicles have migrated toward hybrid electric technology, where the main propulsion is performed by electric drives. Future space vehicles will require electric drives for thrust vector and flight control actuation. These systems must be more robust and will offer greatly reduced operating costs and safety compared to the existing Space Shuttle hardware. Therefore, substantial demand for improved electric drive performance has arisen.

These new aerospace trends have created a significant challenge for HPED systems, including increased operating voltages, and reduced system losses, weight, and volume. A new set of power quality and EMI requirements has been created to satisfy both quality and performance issues. The overall result is a significant increase in the installed EM, creating challenges for utilizing this equipment on the new platforms. Therefore, overall system performance improvement and power density increase are necessary attributes for the new-generation machines. Cost is an additional driver that must be addressed to make the new platforms affordable.

The process of designing EM to achieve these new requirements requires the selection, analysis and optimization of a large number of characteristics. The complexities of the design process may take a large amount of time and effort and may still not result in an optimal design. As can be seen, there is a need for improving the EM design process to meet the increasing demands of new HPED systems.

SUMMARY OF THE INVENTION

In one aspect of the present invention, a method of selecting and optimizing an electric drive system comprises defining critical-to-quality (CTQ) values for the electric drive system; selecting a design approach for the electric drive system; and optimizing the CTQ values and the design approach.

In another aspect of the present invention, a method of selecting and optimizing an electric machine (EM) for a high performance electric drive (HPED), comprises analyzing critical-to-quality (CTQ) subjects of the HPED according to Six Sigma theory; the CTQ subjects including weight, volume, reliability, efficiency, and cost; defining relative weights for each CTQ subject; calculating a preliminary optimal design based on the weighted CTQs; selecting a design approach including the selection of at least one of the following: electric machine type, cooling system, electrical integration, mechanical integration, and an electrical-mechanical interface; calculating a potential optimal design based on the selected design approach; and comparing the preliminary optimal design to the potential optimal design to determine whether the potential optimal design is acceptable.

In a further aspect of the present invention, a method of selecting and optimizing an electric drive system comprises selecting at least one measurable characteristic for the electric drive system; defining at least one constraint value for each of the measurable characteristics; defining a relative weight value for each of the measurable characteristics; calculating subtotals by multiplying each of the measurable characteristics and each of the relative weight values; adding each of the subtotals; and performing iteratively the following steps until an optimal design is obtained: selecting a design approach including the selection of at least one of the following: electric machine type, cooling system, electrical integration, mechanical integration, and an electrical-mechanical interface; and correlating each of the subtotals with at least one of the following key characteristics of the electric drive system: rotor losses, stator losses, windage losses, rotor thermal limitations, cooling options, rotor mechanical limitations, torque-to-inertia ratio, torque pulsation, compatibility with bearings, high-speed capability, short circuit behavior, machine complexity, current density, and power density.

These and other features, aspects and advantages of the present invention will become better understood with reference to the following drawings, description and claims.

BRIEF DESCRIPTION OF THE DRAWINGS

FIG. 3 is a table of key characteristics of an electric machine in accordance with one embodiment of the present invention.

DETAILED DESCRIPTION OF THE INVENTION

Figure 1:
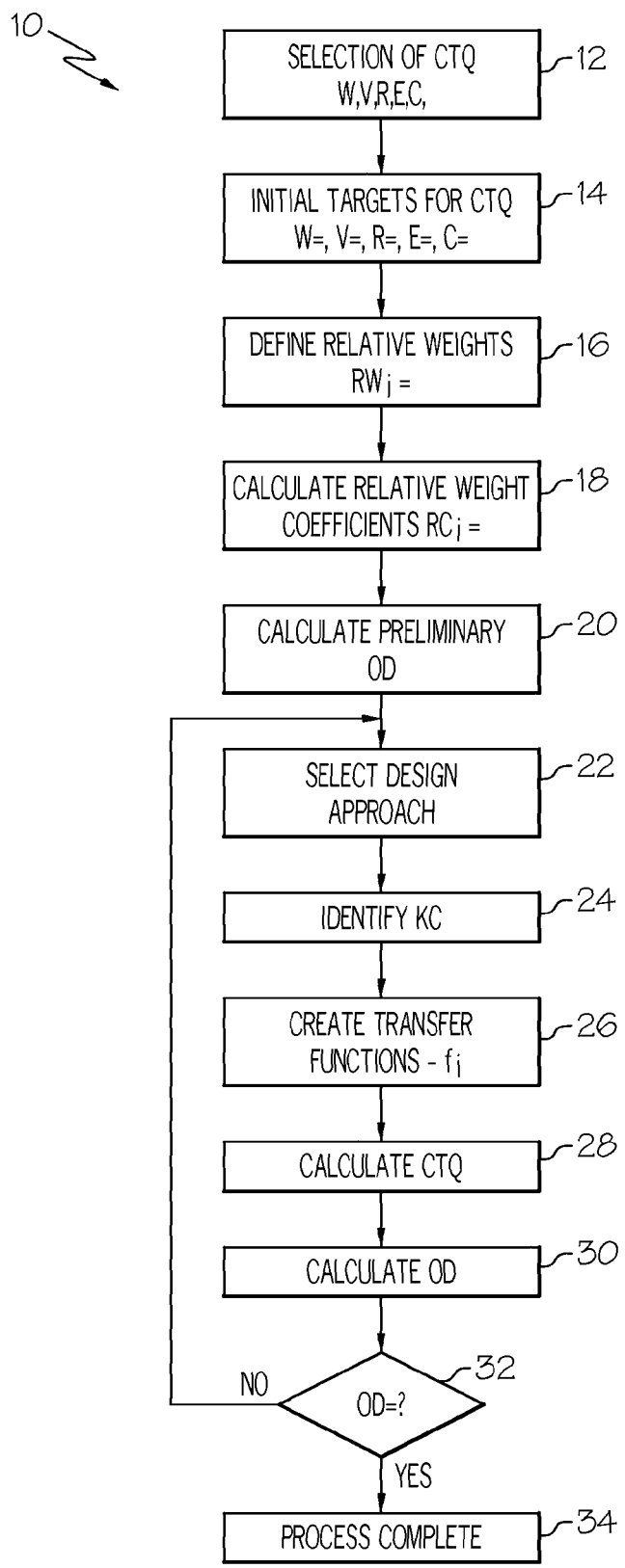
FIG. 1 is a flow chart of a statistical method for high performance electric drive optimization in accordance of one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for selecting and optimizing electric machines (EM) for high performance electric drives (HPED) used, for example, in aircraft, spacecraft and military ground vehicles. The method according to the invention may do this by analyzing critical-to-quality subjects of the HPED according to Six Sigma theory and then by balancing the CTQ subjects. These CTQ subjects may include weight, volume, reliability, efficiency and cost. Prior design tools may not have applied Six Sigma theory to CTQ subjects or may not have provided a methodology for the selection of the type of EM, but rather only related to optimizing one particular type of EM.

In accordance with one embodiment of the invention, a method for selecting and optimizing EM may analyze those aspects of Six Sigma theory that relate to CTQ. CTQ is one of a select few characteristics of an end-unit product or model that can have a significant impact on product performance. Using this approach, weight, volume, reliability, efficiency, and cost CTQs may be addressed to develop balance among them, resulting in an optimized design. The following are brief descriptions of exemplary selected CTQs.

The weight (W) is one of the most important CTQs for an aerospace application. This product characteristic directly affects overall vehicle performance.

The volume (V) becomes an important CTQ, particularly recently when the installed electric drives and overall power electronics content is increased substantially.

The reliability (R) directly affects mission success, maintenance, repair, and dispatchability.

The efficiency (E) becomes a major driver for fuel saving in an environment where a large amount of energy is converted from mechanical to electrical.

The cost (C) is directly related to the affordability of a new platform.

Relative weight coefficients (RC) may be assigned to each CTQ to define customer priorities or relative weights (RW). The product of a CTQ and the corresponding RC results in an RW for this CTQ. In formula (1), i=1, 2, 3 . . . m, where m is the number of the selected CTQs. In this example m is 5. The indexes 1 through 5 can be replaced directly with the abbreviations W, V, R, E, and C adopted above.

$$RW_i = RC_i * CTQ_i \quad (1)$$

The relation of all RW expressed by a function F results in an optimal design (OD). F is typically a sum function. However, different functions can be used. See formula (2).

$$OD = F(RW_w, RW_v, RW_R, RW_E, RW_C) \quad (2)$$

Key characteristic (KC) is a parameter the value and variation of which is key to a CTQ. Identifying a parameter as a KC may impose a requirement that a supplier measure and report the statistics for that parameter. Typical for an electric drive system KC are high-speed capability, rotor thermal limitations, torque-to-inertia ratio, windage losses, and power density.

The relation between CTQ and KC may be defined using transfer functions. Formula (3) in generalized form describes the dependence of i=1, 2, 3, . . . m, where m is the number of the selected CTQ on n numbers of KCs. Where j=1, 2, 3 . . . n, a transfer function $f_i$ is defined for each CTQ.

$$CTQ_i = f_i(KC_1, \ldots KC_j, \ldots KC_n) \quad (3)$$

Expression (4) is a specific example for the selected five exemplary CTQs in this embodiment.

$$W = f_W(KC_1, \ldots KC_j, \ldots KC_n)$$

$$V = f_V(KC_1, \ldots KC_j, \ldots KC_n)$$

$$R = f_R(KC_1, \ldots KC_j, \ldots KC_n)$$

$$E = f_E(KC_1, \ldots KC_j, \ldots KC_n)$$

$$C = f_C(KC_1, \ldots KC_j, \ldots KC_n) \quad (4)$$

FIG. 1 shows a flowchart defining the sequence of steps for a statistical method for electric drive optimization from an electric machine perspective in accordance with one embodiment of the invention. The method 10 starts with CTQ selection and finishes with an optimal design (OD) solution.

In step 12, the CTQs may be selected. For the purpose of this example W, V, R, E, and C may be used. In step 14, initial targets for all CTQs may be allocated. Step 16 may define the RW for each CTQ. Step 18 may calculate the relative weight coefficient based on RW and CTQ. The preliminary OD may be calculated in step 20. In step 22 a design approach may be selected. This may include, for example, the selection of EM, cooling system, electrical and mechanical integration and interfaces. Step 24 may identify KC related to CTQ. Step 26 may create transfer functions $f_i$, which correlates the KC with CTQ. In step 28 the new CTQs may be calculated based on a specific design. In step 30 the OD may be calculated based on the newly calculated CTQ on a specific design. Step 32 branches the process in two directions. If optimal design is achieved, transition to step 34 may be performed toward completion of the process. In case of non-satisfactory results for OD, the process may be returned to step 22 for selection of a different design. This closed loop may be repeated several times until OD is achieved.

Figure 2:
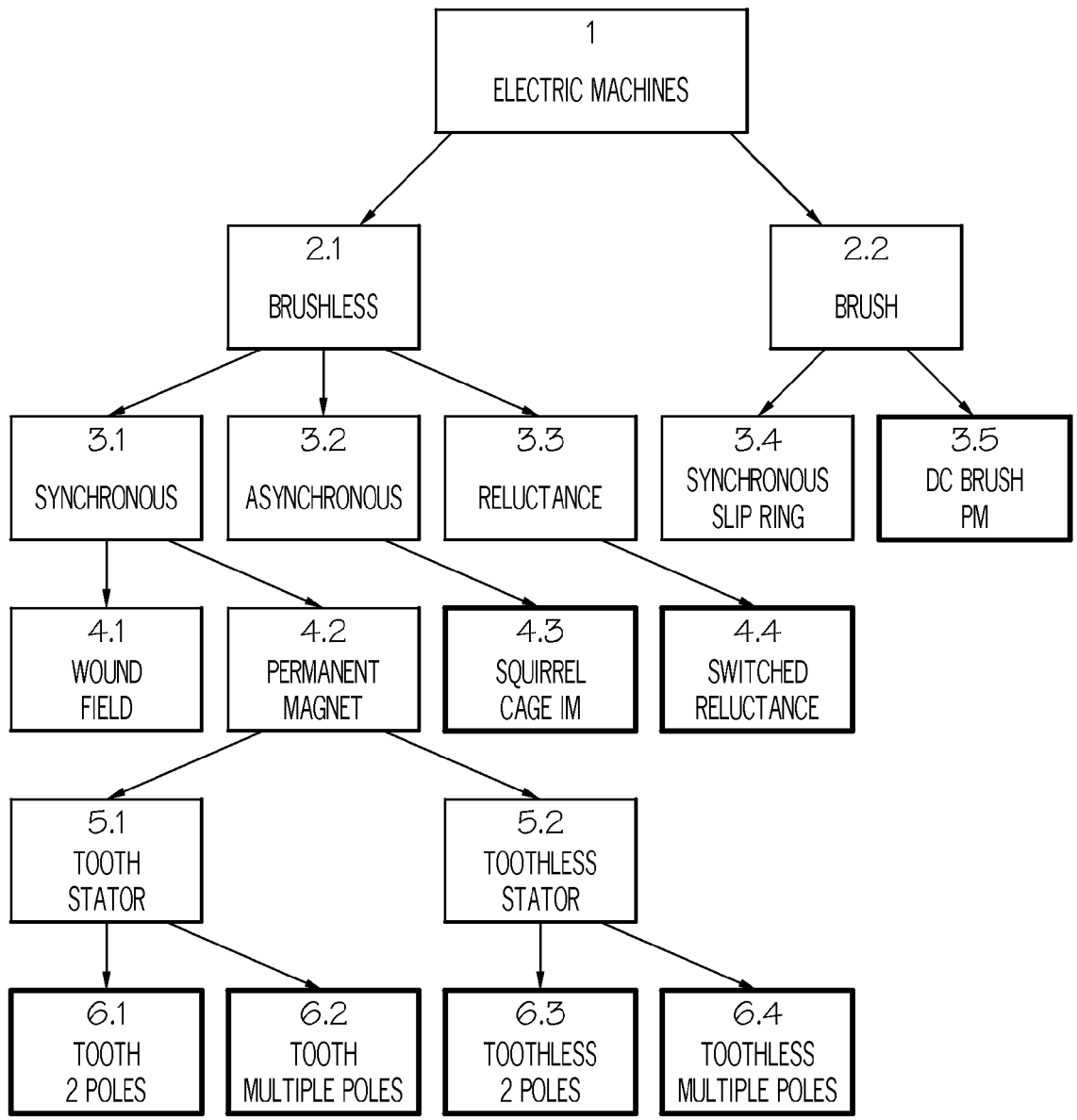
FIG. 2 is a chart of various types of electric machines used in the selection of the design approach in the statistical method shown in FIG. 1.

FIG. 2 shows electric machine classifications, including those most commonly used in the HPED for aerospace applications. Seven exemplary electric machines that may be preferably used in HPED systems may be further evaluated based on their key characteristics in accordance with an embodiment of the invention. Other kinds of machines besides these seven could also be evaluated using the techniques of the invention. These seven electric machines are shown with bold boxes in FIG. 2. FIG. 3 shows a table of 14 exemplary key characteristics that apply to these seven electric machine types. Other key characteristics besides these 14 could also be used in accordance with other embodiments of the invention. The following is a description of these 14 key characteristics.

KC 1 (Rotor Losses): The rotor losses may be an important characteristic related to the ability to provide efficient cooling of the electric machine. It may be much easier to cool a stator rather than a rotor. Removal of heat from a fast rotating object may be a much more difficult task that may require additional cooling capacity and may create additional machine losses such as windage. The ultimate winners in this category may be the Permanent Magnet Machine (PMM) where most of the losses may be located in the stator. Minimal eddy current losses may be present in the magnet and in the rotor sleeve when metal material is used. In case of the composite sleeve, even fewer losses may be experienced. The loser here may be the DC brush Permanent Magnet (PM) machine, where most of the losses are located in the rotor. The IM and SRM may be placed in the middle.

KC 2 (Stator Losses): For stator losses the superior EM may be the DC brush PM machine, where most of the losses may be in the rotor and there may be very small eddy current losses in the stator. All other machines may have similar ratings because the stator construction in general may be similar. The toothless PMM may be considered to have more stator losses compared to tooth machines due to the flux in the containment ring. The multi-pole PMM may have fewer stator losses due to better back-iron utilization.

KC 3 (Windage Losses): The windage loss may occur in the mechanical air-gap of the machine. This loss may be a function of the size of the air-gap, the tip speed of the rotor, the rotor and stator surface quality, and the medium in the air-gap. If additional gas flow is introduced in the air-gap for cooling or other purposes, the loss may be increased. The winners in this category may be all PMMs, due to the smooth cylindrical shape of the rotor and large air-gap size. The toothless machines may be slightly better due to an inherently larger air-gap. The SRM may be in worse condition due to the complex rotor shape. The Induction Machine (IM) may be rated much lower compared to PM machines, which may primarily be due to the rough rotor surface made out of laminated steel and embedded copper or aluminum bus bars. Also, the IM may need more gas flow in the air-gap for rotor-cooling purposes compared to the PMM. This loss may be higher for the DC brush machine because of its even more complex rotor construction.

KC 4 (Rotor Thermal Limitations): The rotor thermal limitation may characterize an electric machine's ability to be integrated in a high-temperature environment such as an engine. This characteristic may primarily depend on the thermal properties of the materials. All PMMs may be rated low due to the use of permanent magnet material. The winner in this category may be the Switched Reluctance Machine (SRM) that uses steel lamination material operating at much higher temperature. The IM may be slightly worse compared to the SRM due to additional copper or aluminum bus bars. The DC brush PM machine may be worse compared to the IM but still better than the PMM. The temperature of a machine rotor may be a function not only of an external thermal source but also of self-heating. Therefore, in some applications the PMM with small rotor losses may reach the temperature limitations after other machines.

KC 5 (Cooling Options): The cooling options may be an important feature which comes from the location of the losses. Machines with minimal or no losses in the rotor may be easier for cooling and create fewer complications to the cooling system. The PMM may have the highest rating because of minimal losses in the rotor. The ring PMM may be considered easier for cooling compared to the tooth stator PMM since the windings may be exposed rather than buried in the stator slots. The IM and SRM may be equally rated much lower compared to the PMM due to the substantial rotor losses. The DC brush PM machine may be rated very low since most losses may be located in the rotor.

KC 6 (Rotor Mechanical Limitations): The rotor mechanical limitations may be directly connected with the EM high-speed capabilities and the ability to integrate the rotor with a high-speed load. The stiffness of the rotor may be paramount to high-speed integration. Again the PMM rigid-metal or composite-sleeve construction may behave best. The toothless PMM may be slightly better due to lower dependence on the mechanical air-gap and ability to install a thicker sleeve. Next is the SRM, whose simple rotor design places this machine at a high level. The IM with embedded heavy bus bars may be sensitive to the high centrifugal forces at high speed. The DC brush PM machine may be in the worst place again due to the complex rotor and a need to have a low gage wire embedded in a rotor.

KC 7 (Torque-to-Inertia Ratio): The torque-to-inertia ratio characteristic may be important for an application where fast response of a system is required. This may be typical for an actuation application. Sometimes electric drives may have a requirement for fast acceleration and deceleration for fast transition from one speed to another. Then dynamic and steady-state operations may be traded to achieve a balanced performance. Traditionally PMM may be the best in this category. The DC brush PM machine, although limited in maximum speed, may have a good ratio. The SRM and IM may be worse. They can be used for a low-performance application because of low cost.

KC 8 (Torque Pulsation): The torque pulsation characteristic may play an important role where the application is very sensitive to vibration. The torque pulsation may excite a system that is not mechanically damped and lead to catastrophic consequences. The International Space Station Alpha may be a typical example of such an application. There may be two main sources in an electric drive for torque pulsation—the current pulsation in the stator winding and the cogging torque. The SRM machine may be probably the only one where the operation is based on synchronous current commutation between phases with irregular non-sinusoidal wave shapes. Here a torque pulsation may occur during transition from one phase to another. The cogging torque may be an inherent behavior of a tooth stator interacting with a permanent magnet rotor when rotated. This may be the reason the tooth PMM is rated low. The toothless machine does not have cogging torque, leading to a very smooth operation. The low rating of the DC brush machine comes from the torque pulsation created by the current ripple resulting from the mechanical commutation. The induction machine may be good due to lack of permanent magnet in the rotor.

KC 9: The compatibility with different bearing systems is important for achieving a high-speed electric drive. Transition from conventional bearings to foil or magnetic bearings is one of the most powerful provisions for HPED. The rotor stiffness and the large air-gap are the two most important parameters to accommodate this integration. The integration of rotor and load should be carefully designed to allow for critical speed accommodation. The ultimate winner here is the PMM. The toothless designs are slightly better than the tooth PMM machine because of lower sensitivity to air-gap size. The performance of the IM and SRM is very sensitive to the size of the air-gap. Therefore, these machines present challenges for a successful integration with foil or magnetic bearings. The DC brush PM Machine speed is so low that it makes integration of foil bearings impractical.

KC 10: The high-speed capability is a composite characteristic resulting from several other parameters such as rotor mechanical limitations, rotor losses, windage losses, rotor thermal limitations, and machine complexity. The PMM wins primarily due to rotor high stiffness and low sensitivity to air-gap.

KC 11: The short circuit behavior characteristic is related to the ability of an EM to generate excessive currents in case of failure, even after the inverter operation is disabled. All PMM and DC brush PM machines are rated very low because permanent magnet creates one of the fluxes and cannot be disengaged electrically. Hence, an electromotive force (EMF) voltage is generated until the rotor is turning. As a result, an excessive short circuit current may be fed to the point of failure at a broad speed range from 5 to 100%. The PMMs are rated higher because of the ability to create a "high-reactance permanent magnet machine" (HRPMM), which mitigates this issue to a great extent. This type of machine is designed with a much higher reactance compared to the conventional machine, resulting in a short circuit current comparable to the operating current. The SRM and IM receive the highest score since their construction does not use PM materials. In case of failure after shutting down the inverter, the failure current duration is within the electrical time constant. The magnitude may not exceed the operating current substantially. The DC brush PM machine is rated lowest because of impracticality to create a high reactance machine.

KC 12 (Machine Complexity): The machine complexity characteristic may have a direct impact on the reliability. The winner in this category may be the SRM because of the simple rotor construction. Next may be the PMM due to the simple robust rotor design with metal or composite sleeve. The toothless PMM may be slightly worse compared to the tooth design due to the additional metal ring. The IM stator may be very similar to the PMM tooth stator. However, the rotor complexity of the IM may be worse. Consequently, the IM may be placed slightly lower than the PMM. The DC brush PM stator may be relatively simple. However, the rotor complexity and the brush system may be negative contributions.

KC 13 (Current Density): The current density represents the ability of an electric machine to be loaded with certain ampere turns per unit surface of the outer diameter. This characteristic may be directly related to the ability of a machine to be cooled. The highest rated EM may be the tooth PMM because it has the best efficiency and, respectively, lowest losses. The toothless design may be worse because of the stray flux losses contained within the outer stator ring and the inability to cool the main stator ring directly. The IM current density may be lower because of additional losses in the rotor compared to PMM and the overall worse efficiency. The current density of the DC brush PM machine may be worse.

KC 14 (Power Density): The power density of a machine may be a composite characteristic dependent on other characteristics and can be applied either to weight or volume. Based on many practical implementations, the tooth PMM may have the highest rating, followed by the toothless PMM. The SRM may be next due to its ability to operate at very high speed. Next may be the IM because of the rotor losses and rotor speed limitations. The worst may be again the DC brush PM machine.

The last row in FIG. 3 contains the total score for all 7 evaluated machines. The ultimate winners may be the PMMs, with a very small difference between different types. Within the PMM family, multi-pole designs may be slightly better due to more efficient utilization of the stator core iron. The toothless designs may be slightly better due to less windage losses, better cooling options, overall better mechanical performance, and lack of cogging torque. The IM and SRM may be equally rated and about 25% worse compared to the PMM due mainly to much higher losses in the rotor. The IM may have a definite advantage in windage losses and torque pulsation compared to the SRM. The SRM may have advantages in rotor thermal limitation, rotor mechanical limitation, high-speed capability, and machine complexity. The DC brush PM Machine may be about two times poorer than the IM and SRM and three times worse compared to the PMM. The DC brush PM Machine may be targeted for replacement in most high-power applications such as APU engine starters. In most cases the new machine may be the PMM and in some the IM. In some low-cost, not-very-high-performance actuation systems, the DC brush may continue to be used due to low cost and simpler electronics required for control. The IM may be best for 400 Hz bus constant speed drives, but not for VF and DC buses. Once power electronics is included to decouple the new buses from IM may be a temptation to replace the IM with the PMM to achieve much better performance. Once power electronics is included, either for the IM or the PMM, the variable speed capability may become easily achievable without additional hardware penalty. More complex control may be required. The electronically controlled IM drives for constant or variable speed may remain in service primarily because of lower cost compared to the PMM. These applications may be low-speed fans and mid- to low-performance actuators. The SRM machine may not be very well understood and evaluated for aerospace applications at this point. However, low-cost electric drives in low- to mid-performance levels could be achieved.

Figure 4A:
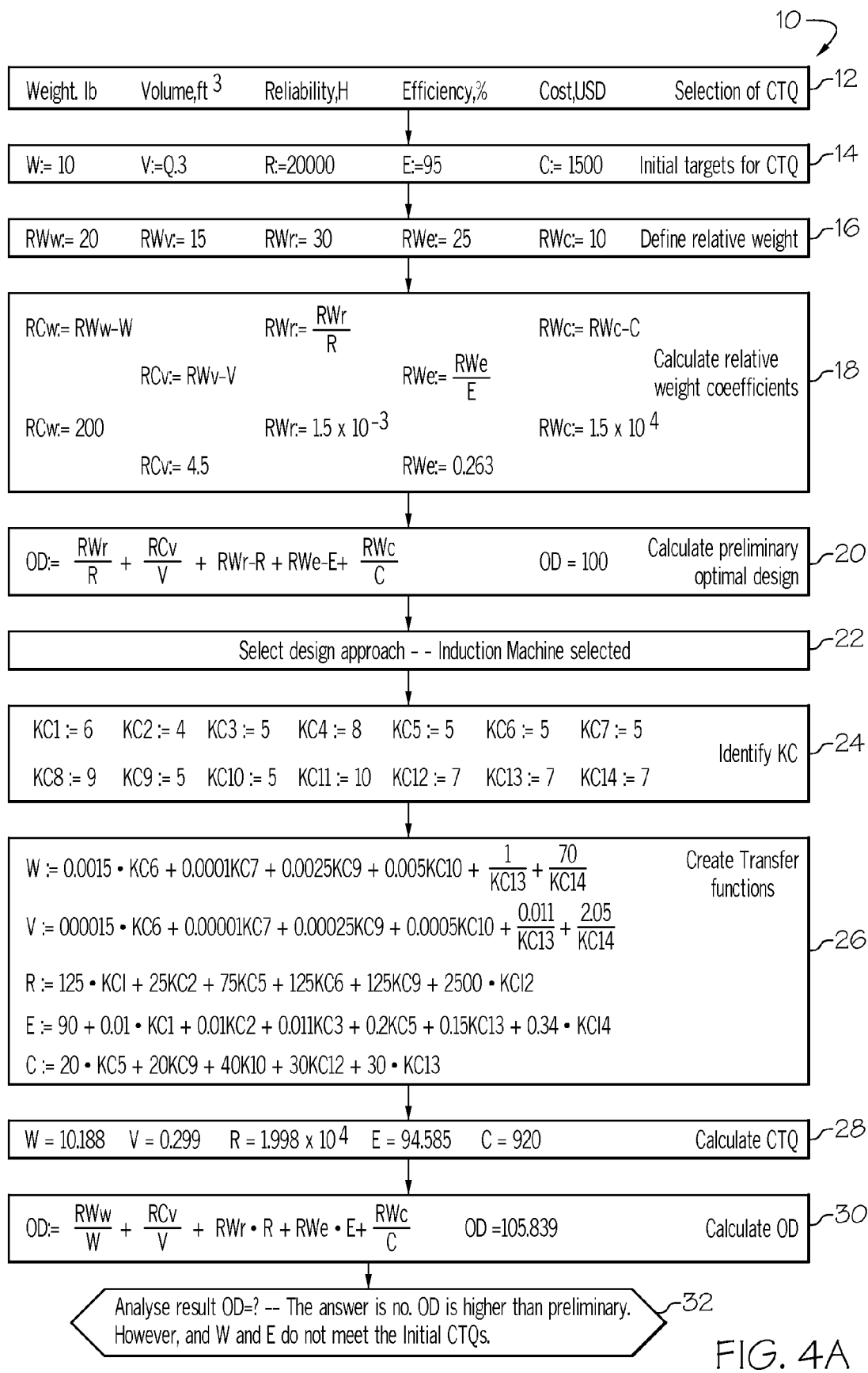
FIGS. 4A-B are flow charts showing some of the steps in the statistical method shown in the flow chart of FIG. 1 with exemplary calculations of an optimal design for an electric machine in accordance with one embodiment of the present invention.
Figure 4B:
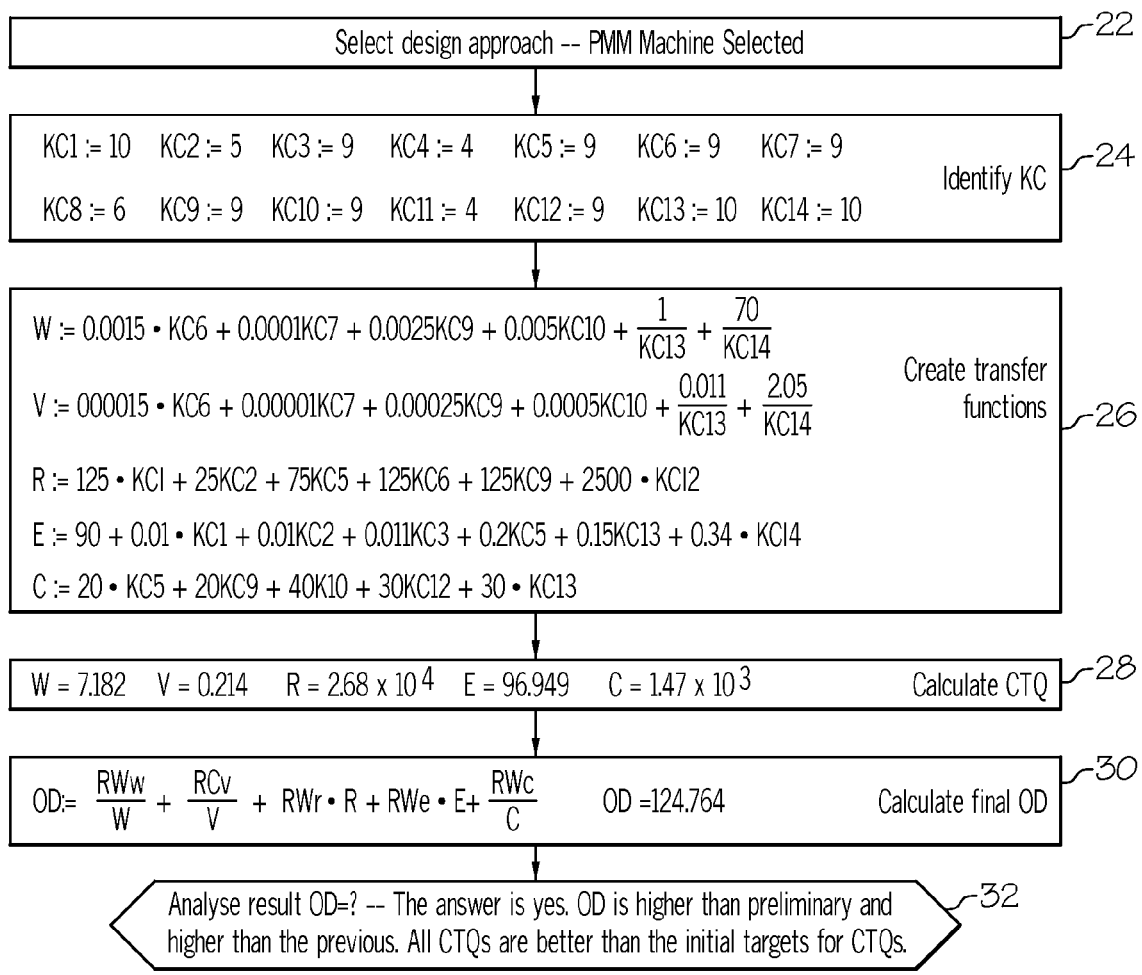

FIGS. 4A-B show an example of the calculation of an optimal design for an electric machine in accordance with one embodiment of the present invention. In FIG. 4A, steps 12-32 are shown, for a particular example. Steps 12-32 in FIG. 4A correspond to steps 12-32 in FIG. 1. In step 12 five critical-to quality (CTQ) subjects of weight, volume, reliability, efficiency and cost may be selected along with the unit of measurement of the subject. These may be pounds for weight, $ft^3$ for volume, H for reliability, percent for efficiency and U.S. dollars for cost. In step 14 the initial targets for these CTQs may be selected. These targets may be numerical values in the above-discussed units of measurement. In step 16 the relative weights may be chosen based on the relative importance of each CTQ for the particular application. These numbers may percentages that add up to 100. This example shows that reliability may be the most important CTQ, since it has the highest weight of 30%. In step 18, the relative weight coefficients may be calculated using equation (1) discussed above. In step 20 an optimal design (OD) may be calculated using the above-discussed equation (2). In this example, the OD is 100. In step 22 a design approach may be selected, which in this example may be the induction machine. In step 24 the key characteristics (KC) for the induction machine may be determined. These values shown may be taken from the KC values for an induction machine in FIG. 3. In step 26 transfer functions may then be calculated for each CTQ using equation (3) discussed above. Note that the KCs used for this calculation may be only those that are relevant to the CTQ and may not be all of the possible KCs. In step 28 the CTQs may be calculated using equation (4). The OD value may then be calculated from equation (2) for the induction machine in step 30. In this example the OD is 105.839. In step 32 it may be observed that the OD for an induction machine is higher than the preliminary OD of 100. This would seem to indicate that the design is acceptable. Even so, this design may still not be acceptable because some of the initial target CTQs were not met. In particular, the target CTQ for weight was 10 pounds, which is exceeded by the calculated weight for the induction machine of 10.188 pounds. Also, the target CTQ for efficiency of 95% was not met by the induction machine which had a value of 94.585%.

At this point, the designer of the electrical drive system may choose to explore other design approaches and return to step 22 for the new design approach. FIG. 4B shows steps 22-32 as applied to the example of a permanent magnet machine (PMM). In step 22 the PMM tooth two pole design may be selected. The KCs, from FIG. 3 may be identified for the PMM tooth two pole machine in step 24. Transfer functions may then be generated for each CTQ in step 26. The five CTQ's for the PMM tooth two pole machine may then be calculated in step 28. In step 30 the final OD may be calculated, which in this example is 124.764. It may be seen that this value is significantly higher than the 105.839 OD for the induction machine, indicating that the PMM tooth two pole is a superior design. Also, all the CTQs are better than the target CTQs. At this point it is up to the discretion of the designer whether to select the PMM tooth two pole machine or to repeat the process with other designs to determine if there may be even better design choices.

As can be appreciated by those skilled in the art, the present invention provides a method for obtaining an optimal electric machine design for high-performance electric drives. An optimal design is achieved by analyzing critical-to-quality subjects of the HPED according to Six Sigma theory. The balancing of CTQ subjects such as weight, volume, reliability, efficiency and cost, results in the selection of optimal machine and design characteristics. It will also be appreciated by those skilled in the art that different embodiments of the invention may use other CTQ subjects and CKs besides those discussed in the examples above.

It should be understood, of course, that the foregoing relates to exemplary embodiments of the invention and that modifications may be made without departing from the spirit and scope of the invention as set forth in the following claims.

I claim:

1. A method of manufacturing an electric drive system, comprising:
    selecting and optimizing an electric drive machine by performing the following steps:
        defining critical-to-quality values for said electric drive machine;
        defining at least one initial target value for each of said critical-to-quality values;
        defining a relative weight for each of said critical-to-quality values;
        calculating a relative weight coefficient for each critical-to-quality value;
        calculating a preliminary optimal design as a function of said critical-to-quality values and said relative weight coefficients; and
        subsequent to calculating the preliminary optimal design, selecting a first design approach, from among types of electric machines, for said electric drive machine and optimizing said critical-to-quality values in said first selected design approach, wherein optimizing said critical-to-quality values includes:
        determining a value for each key characteristic based on said first selected design approach;
        creating a transfer function for each critical-to-quality parameter based on the value of each of the defined key characteristics for each said critical-to-quality parameter;
        calculating a first design approach critical-to-quality value for each said critical-to-quality parameter of said first design approach using said transfer function;
        calculating an optimal design for said first selected design approach based on each of said design approach critical-to-quality values; and
        comparing the value of said calculated optimal design for said first selected design approach to the value of said preliminary optimal design;
    selecting a second design approach, from among types of electric machines, if said comparison determines that the value of said calculated optimal design for said first selected design approach is less than the value of said preliminary optimal design;
    performing a second comparison of the value of said calculated optimal design for said second selected design approach to the value of said preliminary optimal design; and
    selecting said second selected design approach for said electric drive system if said second comparison determines that the value of said calculated optimal design for said selected design approach is at least as great as the value of said preliminary design.

2. The method of claim 1 wherein calculating the relative weight coefficient for each critical-to-quality value comprises multiplying each of said critical-to-quality values by one of said relative weight values.

3. The method of claim 2 wherein said relative weights added together equals 100.

4. The method of claim 3 wherein the step of calculating a preliminary optimal design comprises determining the sum of each relative weight coefficient divided by the corresponding critical-to-quality value.

5. The method of claim 1 wherein said design approach includes the selection of at least one of the following: electric machine type, cooling system, electrical integration, mechanical integration, and an electrical-mechanical interface.

6. The method of claim 1 wherein said key characteristics include at least one of the following: rotor losses, stator losses, windage losses, rotor thermal limitations, cooling options, rotor mechanical limitations, torque-to-inertia ratio, torque pulsation, compatibility with bearings, high-speed capability, short circuit behavior, machine complexity, current density, and power density.

7. A method of manufacturing an electric drive system, comprising:
    defining an optimal design for an electric machine for a high performance electric drive by analyzing critical-to-quality subjects of said high performance electric drive,
    defining target values for each critical-to-quality subject,
    defining relative weights for each critical-to-quality subject, and
    calculating an optimal design target value based on said weighted critical-to-quality subjects; selecting a first design approach, from among types of electric machines, cooling system, electrical and mechanical integration and interfaces,
    determining a calculated critical-to-quality value for each of a plurality of critical-to-quality parameters of the first selected design approach, wherein the critical-to-quality value is based on a transfer function, the transfer function being a function of values of key characteristics for each of said critical-to-quality subjects,
    wherein if a comparison determines that said calculated optimal design target value for said first selected design approach is less than said calculated critical-to-quality value of said first selected design approach, then a new design approach, from among types of electric machines, cooling system, electrical and mechanical integration and interfaces, is selected.

8. The method of claim 7 wherein said critical-to-quality subjects include weight, volume, reliability, efficiency and cost.

9. The method of claim 7 wherein said step of defining relative weights for each critical-to-quality subject comprises determining the relative importance of each critical-to-quality subject and assigning a percentage to each critical-to-quality subject that reflects said determined relative importance.

10. The method of claim 9 further comprising calculating a relative weight coefficient for each critical-to-quality value.

11. The method of claim 10 wherein said step of calculating said relative weight coefficient comprises multiplying said target critical-to-quality values by said corresponding relative weight for said target critical-to-quality value.

* * * * *